UNITED STATES PATENT OFFICE.

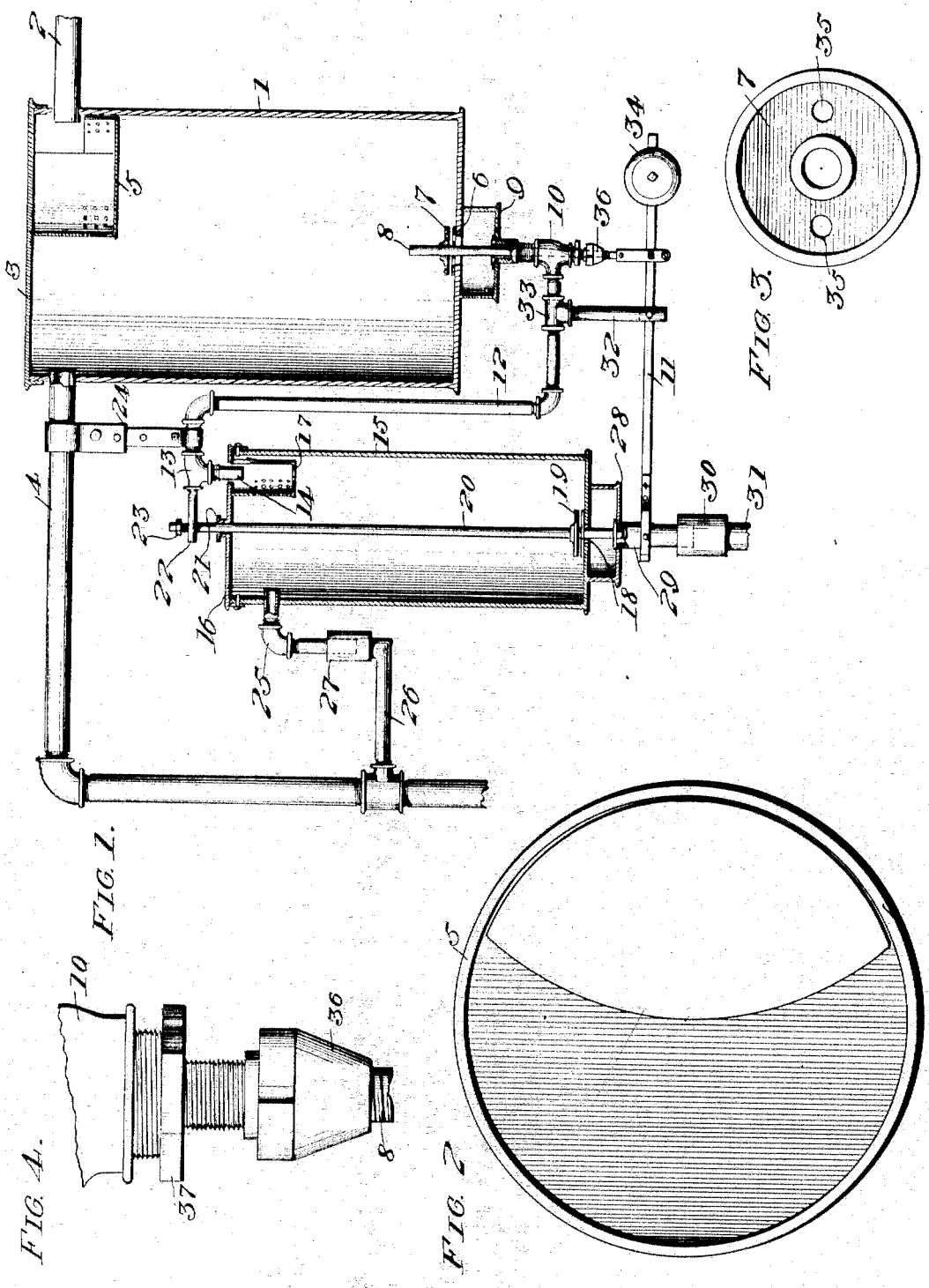

JOHN FRED GOUCHENOUR, OF GREYBULL, WYOMING.

OIL AND WATER SEPARATOR.

1,315,662.     Specification of Letters Patent.     Patented Sept. 9, 1919.

Application filed June 27, 1919. Serial No. 307,225.

*To all whom it may concern:*

Be it known that I, JOHN F. GOUCHENOUR, a citizen of the United States, and a resident of Greybull, in the county of Big Horn and State of Wyoming, have invented certain new and useful Improvements in Oil and Water Separators, of which the following is a specification.

My invention is an improvement in oil and water separators, and has for its object to provide a separator of the character specified adapted to be arranged between the condensers and the receiving tank to eliminate a maximum amount of water from the mixture and to recover a maximum amount of oil, wherein a balanced trap is provided, controlled to discharge by excess of water in the trap, and wherein the feed of the mixture to the trap is also controlled by excess of water in the trap.

In the drawings:

Figure 1 is a sectional view showing the improved separator;

Fig. 2 is a bottom plan view of the cover of the drum;

Fig. 3 is an enlarged top plan view of one of the valves;

Fig. 4 is a detail of the valve stem mounting.

In the present embodiment of the invention a tank or drum 1 is provided, of cylindrical form, to which the pipe 2 carrying the mixture from the condensers delivers, the said pipe opening at the top of the drum. The drum has a cover 3, and a discharge pipe 4 to the receiving tank leads from the opposite side of the drum at the same level as the pipe 2.

This cover 3 carries a strainer 5 to which the pipe 2 delivers, and the drum has an outlet port or passage 6 in its bottom. This port is controlled by a valve 7, which is secured to a stem 8, which passes downwardly through an extension 9 on the bottom of the drum, encircling the port 6, and through a T 10 connected to a nipple on the extension, the T having a stuffing box, as shown, and the stem is connected with a lever 11 at its lower end, said lever being mounted in a manner to be presently described.

A pipe 12 leads from the lateral branch of the T 10 outwardly and then upwardly, and again outwardly with respect to the drum 1, the said pipe 12 having at its free end a T 13, having a depending outlet 14 which delivers to the trap 15 to be described. This trap 15 is cylindrical and has a cover 16 connected therewith, and the discharge pipe 14 of the T delivers through an opening in the cover into a strainer 17 supported by the cover 16. The trap has a port 18 in its bottom, with which coöperates a valve 19 on a stem 20, and the said stem is mounted to slide in the trap, moving through a stuffing box 21 at its upper end.

An arm 22 extends from the T 13, and the stem 20 passes through an opening in the arm and is engaged by a nut 23 above the arm, the nut limiting the downward movement of the stem with respect to the arm. The pipe 12 is supported adjacent to the T 13 by a bracket 24 connected with the pipe 4.

An oil overflow from the trap passes through a pipe 25 into a branch pipe 26 from the pipe 4, and the pipes 25 and 26 are slidable with respect to each other, the pipe 26 having a cup 27 in which the depending portion of the pipe 25 is movable. The trap 15 has an extension 28 similar to the extension 9 of the drum 1, and this extension has a depending nipple 29 similar to the top 26 which opens into a cup 30, on a waste pipe 31. The lever 11 before mentioned is supported by a bracket arm 32 depending from the lateral branch of a T 33 interposed in the pipe 12, and one end of the lever is forked, the arms of the fork extending on opposite sides of the nipple 29 and being pivoted thereto. The other end of the lever is provided with a counterweight 34 which is adjustable thereon, and the stem 8 of the valve 7 is connected to the lever between the counterweight and the arm 32.

The valves 7 and 19 are similar in shape but not identical in structure and, referring to Fig. 3, it will be seen that the valve 7 has openings 35, which permit a steady but limited flow of water from the drum and from the trap when the valves are closed. The valve 19 has no openings, and both the valves 7 and 19 are flat disks, arranged directly above the ports, the arrangement being such that when they are open the outflowing water must move toward the fork from the sides and not directly above so that no swirling movement is imparted to the water in the drum and trap. The upward movement of the valve stem is limited by a nut 36 which is threaded on the stem 8 below the stuffing box 37 through which the stem passes at the lower end of the T 10.

In operation, the mixture of oil and water from the condenser enters the tank or drum 1 through the pipe 2, passing first through the strainer. It will be understood that the trap 15 is filled with water to a point about one inch below the oil overflow pipe 25, and the trap is balanced by means of the counterweight 34 so that any additional water will cause the trap to move downwardly. The valves on the stems in both drum and trap are adjustable on the stems by means of lock nuts so that they may be set at the proper point. The mixture entering the drum will separate, the water below and the oil above, and as the water accumulates the openings 35 in the valve 7 permit it to escape steadily, the escaping water flowing through the pipe 12 into the trap. When the trap fills to the "breaking" point it will move downward, lifting the counterweight and opening the valve 19. The downward movement of the trap will also open the valve 7, the counterweighted end of the lever 11 moving upwardly to open the valve.

Both valves remain open as long as sufficient water is settling in the drum to hold the trap to the "breaking" point. Oil deposited in the drum will rise to the top and flow on to the tanks through the pipe 4. Oil rising to the top of the trap will also flow into this pipe 4 from the top of the trap. Should there be no water deposited in the drum, two small streams of oil will flow into the trap through the openings 35, and the trap will fill with oil to a point above the overflow. So long as the oil is flowing the trap will not open. The addition of water, however, above a predetermined point will open the trap.

I claim:

1. A separator of the character specified, comprising a drum for receiving the mixture and a trap, a connection between the bottom of the drum and the top of the trap, said drum having a discharge pipe near its top for the oil and the trap having a discharge pipe for the oil near its top leading to the first named pipe, a valve for controlling the connection between the trap and the drum, a lever pivoted to a fixed point intermediate its ends and supporting at one end the trap, the other end of the lever being counterweighted to normally support the trap and a predetermined depth of water, said trap having a water discharge port in its bottom and a fixed valve controlling the port and normally closing the same when the trap is held lifted by the counterweight, said counterweighted lever being also connected to the valve of the drum to open said valve when the trap moves downward, the valve of the drum having restricted openings for permitting a limited discharge of water when the valves are closed, a mixture supplying pipe opening into the drum near its top, said drum and trap having strainers for receiving the mixture.

2. A separator of the character specified, comprising a drum for receiving the mixture and the trap, a connection between the bottom of the drum and the top of the trap, said drum having a discharge pipe near its top for the oil and the trap having a discharge pipe for the oil near its top leading to the first named pipe, a valve for controlling the connection between the trap and the drum, a lever pivoted to a fixed point intermediate its ends and supporting at one end the trap, the other end of the lever being counterweighted to normally support the trap and a predetermined depth of water, said trap having a water discharge port in its bottom and a fixed valve controlling the port and normally closing the same when the trap is held lifted by the counterweight, said counterweighted lever being also connected to the valve of the drum to open said valve when the trap moves downward, the valve of the drum having restricted openings for permitting a limited discharge of water when the valves are closed.

3. A separator of the character specified comprising a drum for receiving the mixture and a trap, a connection between the bottom of the drum and the top of the trap, said drum having a discharge pipe near its top for the oil and the trap having a discharge pipe for the oil near its top leading to the first named pipe, a valve for controlling the connection between the trap and the drum, a lever pivoted to a fixed point intermediate its ends and supporting at one end the trap, the other end of the lever being counterweighted to normally support the trap and a predetermined depth of water, said trap having a water discharge port in its bottom and a fixed valve controlling the port and normally closing the same when the trap is held lifted by the counterweight, said counterweighted lever being also connected to the valve of the drum to open said valve when the trap moves downward.

4. A separator of the character specified comprising a counterbalanced trap adapted to contain a predetermined depth of water and to move downward under an excess of water, said trap having an oil overflow near its top and a water discharge port, a valve for controlling the port normally held closed and adapted to be opened by the downward movement of the trap under excess of water, a receiving drum for the mixture feeding to the trap and having a valve for controlling the feed normally closed and opened by the downward movement of the trap, said valve having means for permitting a restricted flow of water when closed.

5. A separator of the character specified comprising a counterbalanced trap adapted to contain a predetermined depth of water and to move downward under an excess of water, said trap having an oil overflow near its top and a water discharge port, a valve for controlling the port normally held closed and adapted to be opened by the downward movement of the trap under excess of water, and a receiving drum for the mixture feeding to the trap and having a valve for controlling the feed normally closed and opened by the downward movement of the trap.

6. A separator of the character specified comprising a counterbalanced trap adapted to contain a predetermined depth of water and to move downward under an excess of water, said trap having an oil overflow near its top and a water discharge port, and a valve for controlling the port normally held closed and adapted to be opened by the downward movement of the trap under excess of water, means for feeding water and oil to the trap, and means controlled by the movement of the trap for regulating the feed.

JOHN FRED GOUCHENOUR.